(12) United States Patent
Schennum et al.

(10) Patent No.: US 6,194,057 B1
(45) Date of Patent: *Feb. 27, 2001

(54) PARTIALLY IMPREGNATED LIGNOCELLULOSIC MATERIALS

(75) Inventors: Steven Michael Schennum, West Chester; Dimitris Ioannis Collias, Mason; Blair Alex Owens, Fairfield; Andrew Julian Wnuk, Wyoming, all of OH (US)

(73) Assignee: Paper Technology Foundation Inc., Kalamazoo, MI (US)

( * ) Notice: Subject to any disclaimer, the term of this patent is extended or adjusted under 35 U.S.C. 154(b) by 0 days.

(21) Appl. No.: 09/191,211

(22) Filed: Nov. 12, 1998

(51) Int. Cl.[7] .............................. B32B 29/00; B32B 3/28
(52) U.S. Cl. ..................... 428/211; 428/182; 428/219; 428/342; 428/511
(58) Field of Search .................................. 428/182, 211, 428/342, 141, 153, 219, 341, 486, 498, 511, 543; 156/209; 162/109

(56) References Cited

U.S. PATENT DOCUMENTS

| 2,926,116 | 2/1960 | Keim ................................ 162/164 |
| 3,332,901 | 7/1967 | Keim ................................ 260/29.2 |
| 3,656,991 | 4/1972 | Blackwell et al. ................. 117/33.3 |

(List continued on next page.)

FOREIGN PATENT DOCUMENTS

| 0418015 A1 | 3/1991 | (EP) . |
| 0 816 562 A2 | 1/1998 | (EP) . |
| 0816562 A2 | 1/1998 | (EP) . |
| WO 98/24974 | 6/1998 | (WO) . |

OTHER PUBLICATIONS

1994 Plastic Laminates Symposium "Pressure Impregnating of Decorative and Kraft papers" Siegfried Fischer, pp. 133–137.

Corrugator Bonding: TAPPI Press Anthology of Published Papers (1997; TAPPI Press), "Bonding on the Corrugator; Myth of Penetration—Brittle Bonds" by Kroeschell, W., pp. 67–72.

Tappi Journal vol. 76, No. 4, (Apr. 1993), "Saturation Technology for Corrugated Containers" by Jopson, R.N., pp. 207–214.

Siegfried Fischer: "Pressure Impregnating of Decorative and Kraft Papers"; 1994; Plastic Laminates Symposium, pp. 133–137.

William O. Kroeschell: "Bonding on the corrugator"; 1989; TAPPI, pp. 67–72.

R. Nigel Jopson: "Saturation technology for corrugated containers"; Apr. 1993; Tappi Journal vol. 76, No. 4, p. 207–214.

Robert W. Hagemeyer et al.: "Pulp and Paper Manufacture, 3rd edition, vol. 6"; 1992; The Joint Textbook Committee of the Paper Industry, Tappi, CPPA, Montreal, Canada, p. 65–85 (H.H. Espy: "Wet-strength resins").

Database WPI–Section Ch, Week 199347: Derwent Publicatios Ltd., London, GB; AN 1993–375856 XP 002128022 & SU 1 773 925A (Below Chem Articles Prodn Assoc), Nov. 7, 1992, abstract.

Database WPI–Section Ch, Week 197548: Derwent Publications Ltd., London, GB; AN 1975–79396W XP 002128024 & JP 50 076308A (Sumitomo Chem Co Ltd), Jun. 23, 1975, abstract.

Database WPI–Section Ch, Week 199124: Derwent Publications Ltd., London, GB; AN 1991–176285 XP 002128023 & SU 1 581 465A (Mariupol Metallurgy), Jul. 30, 1990, abstract.

R.N. Jopson: "Saturation Technology For Corrugated Containers"; 1992 Corrugated Containers Conferences; TAPPI Proceedings; p. 51–62.

*Primary Examiner*—Donald Loney

(57) ABSTRACT

The present invention relates to partially impregnated lignocellulosic materials. When impregnated with strengthening agents, the partially impregnated materials exhibit increased overall strength while maintaining sufficient adhesive bondability of the surface opposite the impregnation surface.

17 Claims, 4 Drawing Sheets

U.S. PATENT DOCUMENTS

| | | | |
|---|---|---|---|
| 3,849,184 | 11/1974 | Roberts | 117/155 |
| 3,888,624 | 6/1975 | Blackwell et al. | 8/21 |
| 3,982,993 | 9/1976 | Fife | 162/158 |
| 4,040,899 | 8/1977 | Emerson | 162/13 |
| 4,191,610 | 3/1980 | Prior | 162/147 |
| 4,240,935 | 12/1980 | Dumas | 260/9 |
| 4,242,808 | 1/1981 | Luthi | 34/23 |
| 4,520,048 | 5/1985 | Ranger | 427/350 |
| 4,551,199 | 11/1985 | Weldon | 162/109 |
| 4,588,616 | 5/1986 | Menser | 427/430 |
| 4,702,943 | 10/1987 | Long | 427/282 |
| 4,718,982 | 1/1988 | Swenson et al. | 162/206 |
| 4,740,391 | 4/1988 | Long | 427/286 |
| 4,826,555 | 5/1989 | Long | 156/324 |
| 4,894,118 | 1/1990 | Edwards et al. | 162/112 |
| 4,915,989 | 4/1990 | Menser et al. | 427/434.2 |
| 4,919,758 | 4/1990 | Wagle et al. | 162/175 |
| 4,936,920 | 6/1990 | Keritsis et al. | 131/77 |
| 4,982,686 | 1/1991 | Long | 118/406 |
| 5,097,764 | 3/1992 | Waizmann | 101/425 |
| 5,120,773 | 6/1992 | Fischer et al. | 523/400 |
| 5,210,958 | 5/1993 | Bond et al. | 34/18 |
| 5,239,047 | 8/1993 | Devere et al. | 528/339.3 |
| 5,242,545 | 9/1993 | Bradway et al. | 162/135 |
| 5,338,404 | 8/1994 | Lucas et al. | 162/163 |
| 5,378,497 | 1/1995 | Johnson et al. | 427/211 |
| 5,456,800 | 10/1995 | Tansley et al. | 162/158 |
| 5,510,004 | 4/1996 | Allen | 162/168.2 |
| 5,576,546 | 11/1996 | Gagnon | 250/369 |
| 5,585,456 | 12/1996 | Dulaney et al. | 528/332 |
| 5,630,285 | 5/1997 | Kerttula | 34/446 |
| 5,698,295 | 12/1997 | Benner et al. | 428/182 |
| 5,772,182 | 6/1998 | Stambaugh, Sr. et al. | 251/325 |
| 5,776,546 | 7/1998 | Long | 427/402 |
| 5,935,383 | 8/1999 | Sun et al. | 162/158 |

PARTIALLY IMPREGNATED LIGNOCELLULOSIC MATERIALS

FIELD OF THE INVENTION

The present invention relates to partially impregnated lignocellulosic materials. When these lignocellulosic materials are partially impregnated from one surface with solutions or dispersions of strengthening agents they exhibit increased strength while maintaining sufficient adhesive bondability of the surface opposite the impregnation surface.

BACKGROUND OF THE INVENTION

The properties of lignocellulosic materials, such as paper, linerboard, corrugated (also called fluted) medium, cartonboard, and paper structures in general, can be altered to varying degrees by incorporating additives into their matrices or webs. For example, it is known that the strength of linerboard in compression or tension can be substantially increased by incorporating sodium silicate or starch into the structure of the linerboard. However, such incorporation of additives usually affects other functional properties of the lignocellulosic materials adversely. One important functional property of the lignocellulosic materials which may be adversely affected is adhesive bondability. This is especially important if the treated lignocellulosic materials are to be combined with other treated or untreated lignocellulosic materials in a secondary process such as an adhesive bonding operation. One example of an adhesive bonding operation is the formation of corrugated paper structures in which a treated linerboard needs to be combined and adhered to a fluted medium in a corrugator using typical operating conditions, such as speed, temperature profile, etc., and typical corrugating adhesives.

Usually the additives are in the form of a solution or dispersion, and for the purpose of this disclosure the terms solution and dispersion are used interchangeably. Similarly, for the purpose of this disclosure, the terms additive, agent, active, and saturant are used interchangeably. Finally, the terms incorporation, treatment, impregnation, and saturation are used interchangeably for the purpose of this disclosure.

One means of incorporating additives into lignocellulosic materials is by coating one or both surfaces of these materials with the additives. Typical coating operations include spraying, rod coating, blade coating, gravure coating, etc. However, coating operations typically do not achieve sufficient incorporation of the additives inside the lignocellulosic materials which, in most cases, results in minimal property changes. For example, coating of lignocellulosic materials with strengthening agents typically results in minimal strength improvements since most of the strengthening agents remain localized near the incorporation surfaces. In addition to minimal property changes, coating of the surface or surfaces of lignocellulosic materials often causes difficulties when the treated surface or surfaces are to be adhesively bonded to other materials, for example, to another lignocellulosic material. These difficulties arise from the fact that the coating typically covers the surface or surfaces with additives, thereby eliminating adhesive bonding sites, and also limiting or preventing adhesive penetration into the lignocellulosic material.

One approach that addresses this bonding problem is described in U.S. Pat. No. 5,698,295, issued to Benner et al., and assigned to Dallas Enviro-Tek International, Inc. In this patent, a specialty cold set adhesive, which is often more expensive than a conventional starch adhesive, is used to adhesively bond the coated linerboard with coated medium.

Another method that addresses the bonding problem is to reduce the speed of the bonding equipment. In the case that this bonding process is the corrugating process, it has been observed that the corrugating singlefacer must be slowed to an operating rate of less than 300 feet per minute (300 fpm; 91.4 m/min; 1.52 m/s). Commercial corrugating operations typically run in excess of 600 fpm (3.05 m/s). Both approaches described above may result in high process costs, or high material costs, or both.

Another method of incorporating additives into lignocellulosic materials is full impregnation or saturation of these materials. This can be carried out via immersion of the lignocellulosic materials into a bath containing a solution or dispersion of additives for a sufficient period of time. However, such an approach does not solve the adhesive bondability problem, since immersion into the bath would still cause the additives to coat both surfaces of the lignocellulosic materials.

An approach that attempts to solve both problems of insufficient incorporation of additives and lack of adhesive bondability in papers such as linerboard is described in U.S. Pat. No. 5,776,546, issued to Long, and assigned to MIPLY Equipment Inc. The MIPLY process uses one or two converging pressure chambers (e.g. in the form of a journal bearing) to achieve paper web impregnation with various additives. Furthermore, the '546 patent describes pushing the additives away from the impregnation surface with a second additive to displace the first additive from the surface, such that the impregnation surface can be made more suitable for adhesive bonding. However, the process described in the '546 patent requires the use of a secondary treatment and additional processing steps resulting in additional costs and complexity.

What has been missing is a simple and financially-viable means of producing partially impregnated lignocellulosic materials providing increased strength or other enhanced material properties while at the same time also maintaining sufficient adhesive bondability.

SUMMARY OF THE INVENTION

The present invention relates to a partially impregnated lignocellulosic material that results from partially impregnating a first lignocellulosic material with an additive or additives. The impregnation process begins at the impregnation surface of the first lignocellulosic material (i.e., the contact surface between the material and the additives solution or dispersion). The additives penetrate the material across its thickness to various depths, thus covering only part of the material's opposite surface. The partially impregnated lignocellulosic material exhibits enhanced material properties while maintaining adhesive bondability to a second lignocellulosic material without the need for secondary treatment, specialty adhesive, or a modified bonding process.

DETAILED DESCRIPTION OF THE INVENTION

One way to alter the properties of lignocellulosic materials to varying degrees (for example, paper, linerboard, corrugated medium, cartonboard, and paper structures in general) is to incorporate one or more additives into their matrices (also called fiber webs). However, such an incorporation of additives typically affects other functional properties of the lignocellulosic materials adversely.

For example, various strength attributes (i.e., tensile strength, compression strength, flexural strength, etc.) are important properties of lignocellulosic materials that can be increased by incorporating strengthening agents, such as lignosulfonate, other lignin derivatives, sodium silicate, starch, xylan, carboxymethyl cellulose, polyvinyl-acetate, vinyl polymers, acrylic polymers, etc., into their matrices. Lignin derivatives include, but are not limited to, kraft lignin, organosolv lignin, chemically modified lignin derivatives, and mixtures thereof. Other important properties include, but are not limited to, humidity resistance, flexibility, foldability, recyclability, and porosity. On the other hand, an important functional property of the lignocellulosic materials is adhesive bondability. This is especially important if the treated lignocellulosic materials are to be combined with other treated or untreated lignocellulosic materials in a secondary process such as an adhesive bonding operation. One example of an adhesive bonding operation is the formation of corrugated paper structures in which a treated linerboard needs to be combined and adhered to a fluted medium in a corrugator using typical operating conditions, such as speed, temperature profile, etc. and typical corrugating adhesives.

The present invention describes a lignocellulosic material that is partially impregnated with additives in order to improve its material performance while maintaining its adhesive bondability. As a result, there is no need for high cost specialty adhesives or special equipment to bond these materials (e.g. corrugating equipment). An example of such special equipment includes a corrugator with a belt back-up roll as described in U.S. Pat. No. 5,344,520, herein incorporated by reference.

Figure 1:
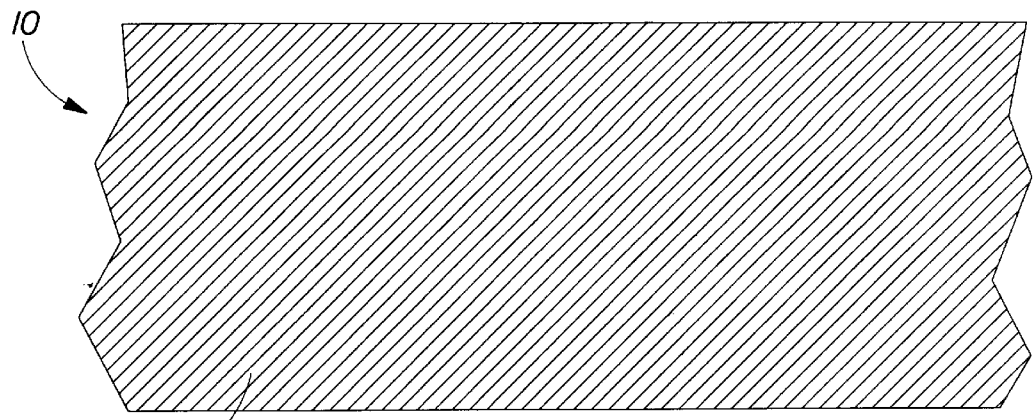
FIG. 1 is a plan view of the impregnation surface of a lignocellulosic material that has been subjected to a partial impregnation process. This surface is fully covered with additives.
Figure 2:
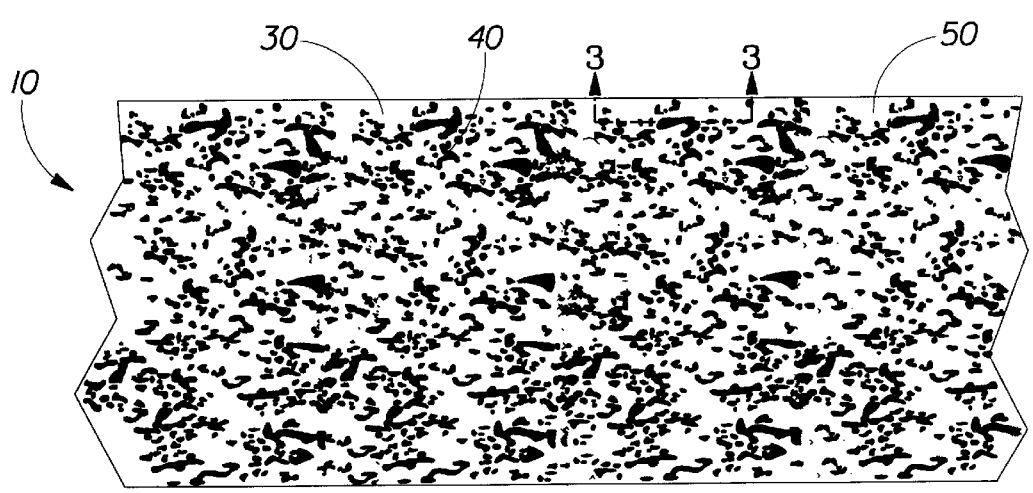
FIG. 2 is a plan view of the opposite surface of a lignocellulosic material. This surface is partially covered with additives which have penetrated from the impregnation surface.

FIGS. 1, 2, 3, and 4 illustrate the resulting partially impregnated lignocellulosic material according to the present invention. This partially lignocellulosic material results from partially impregnating a first lignocellulosic material. FIG. 1 illustrates a section of the substantially-flat impregnation surface 20 of the partially impregnated lignocellulosic material 10. Impregnation surface 20 is the surface from which additives are impregnated into partially impregnated lignocellulosic material 10. Impregnation surface 20 is fully covered with the additives. Impregnation surface 20 extends in both width and length directions. FIG. 2 illustrates the opposite surface 30 of partially impregnated lignocellulosic material 10 of the present invention. Opposite surface 30 is the surface that can be used for adhesive bonding at a later stage. Opposite surface 30 extends in both width and length directions. Opposite surface 30 consists of a number of areas 40 covered with the additives and areas 50 that are not covered with additives, thus resulting in opposite surface 30 being partially covered with additives. This partial coverage of opposite surface 30 with additives facilitates the retention of adhesive bondability of partially impregnated lignocellulosic material 10 to a second lignocellulosic material. Percent coverage of opposite surface 30 with additives is defined as the percentage of the area of opposite surface 30 that is covered with additives. Note that using this definition, the coverage of impregnation surface 20 with additives is 100%. The partial coverage of opposite surface 30 with additives is due to the fact that the additives have penetrated completely through some regions, and penetrated partially through other regions of partially impregnated lignocellulosic material 10.

Figure 3:
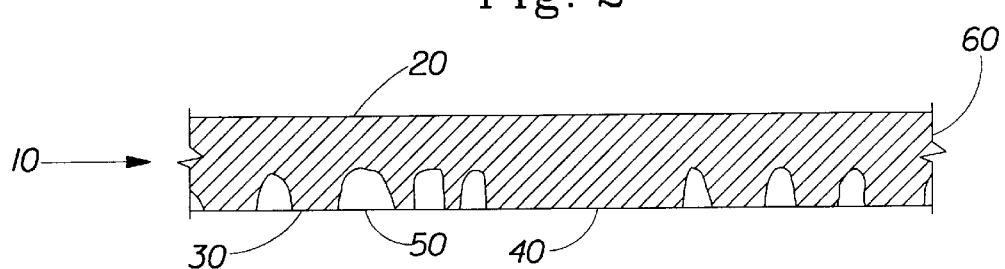
FIG. 3 is a cross-sectional view of a partially impregnated lignocellulosic material along the line 3—3 as shown in FIG. 2.
Figure 4:
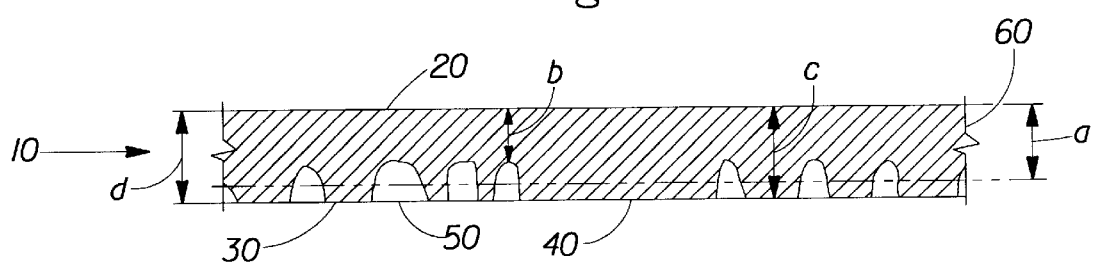
FIG. 4 is a cross-sectional view of a partially impregnated lignocellulosic material along the line 3—3 as shown in FIG. 2. The thickness of the material, the penetration depths of fully impregnated and partially impregnated regions, as ell as the average penetration depth are shown.

FIG. 3 illustrates the distribution of additives, according to the present invention, throughout the thickness 60 of partially impregnated lignocellulosic material 10 and along the line 3—3 of FIG. 2. Area 40 that is covered with additives corresponds to a region of full impregnation, and area 50 that is not covered with additives corresponds to a region of partial impregnation. A region of full impregnation is a part of partially impregnated lignocellulosic material 10 in which the additives have fully penetrated its thickness. A region of partial impregnation is a part of partially impregnated lignocellulosic material 10 in which the additives have partially penetrated its thickness. Note that the regions of impregnation (either full or partial) are three dimensional, whereas the areas are two dimensional (either covered or non covered). FIG. 4 shows the penetration depths of the additives in the various regions, according to the present invention. The thickness of the partially impregnated lignocellulosic material 10 is noted as d. The penetration depth of the additives in a region of full impregnation (e.g. that results in area 40) is noted as c and is equal to thickness d. The penetration depth of the additives in a region of partial impregnation (e.g. that results in area 50) is noted as b and is less than thickness d. The average penetration depth of the additives $\alpha$ is calculated as the average of all penetration depths throughout the impregnated lignocellulosic material. Obviously, in a fully impregnated lignocellulosic material the average penetration depth $\alpha$ is equal to thickness d, and in a partially impregnated lignocellulosic material the average penetration depth $\alpha$ is less than thickness d.

Partially impregnated lignocellulosic materials result from partially impregnating additives into first lignocellulosic materials, such that the average penetration depth of the additives is preferably at least about 50% of the thickness of the partially impregnated lignocellulosic materials, more preferably at least about 60% of the thickness of the partially impregnated lignocellulosic materials, and most preferably at least about 75% of the thickness of the partially impregnated lignocellulosic materials. Furthermore, the first lignocellulosic materials are preferably paper, linerboard (defined as paperboard used for the flat outer facings of combined corrugated board), corrugated medium (defined as the type of paperboard used in forming the fluted portion of corrugated board), fiberboard, and cartonboard, more preferably linerboard and cartonboard, and most preferably linerboard. The basis weight of the first lignocellulosic materials is preferably from about 40 grams per square meter (gsm; about 8 pounds per thousand square feet, lb/msf or #) to about 800 gsm (164#), more preferably from about 50 gsm (about 10#) to about 600 gsm (about 123#), and most preferably from about 60 gsm (about 12#) to about 400 gsm (about 82#).

The partially impregnated lignocellulosic materials have an impregnation surface and an opposite surface. The partial impregnation begins at the impregnation surface, and propagates towards the opposite surface without completely covering it. As a result, the opposite surface has areas of complete coverage with additives and areas of no coverage. The percent coverage of the opposite surface with additives is preferably from 0% to about 60%, more preferably from about 2% to about 50%, and most preferably from about 4% to about 40%.

The preferred list of additives includes lignosulfonate, other lignin derivatives (e.g. kraft lignin, organosolv lignin and chemically modified lignin derivatives), sodium silicate, starch, xylan, carboxymethyl cellulose, polyvinylacetate, vinyl polymers, acrylic polymers, and mixtures thereof. More preferably, the list of additives includes lignosulfonate, other lignin derivatives (e.g. kraft lignin, organosolv lignin and chemically modified lignin derivatives), and mixtures thereof, and most preferably the additive is lignosulfonate. The solvents or dispersants in the additives solutions or dispersions are preferably water, organic solvents, such as, but not limited to, acetone, ethanol, methanol, and methyl ethyl ketone, and mixtures thereof. More preferably, the solvents or dispersants in the additives solutions or dispersions are water, acetone, ethanol, methanol, methyl ethyl ketone, and mixtures thereof. Most preferably, the solvents or dispersants in the additives solutions or dispersions are water, acetone, ethanol, and mixtures thereof.

In a preferred embodiment of the present invention, a partially impregnated lignocellulosic material results from partially impregnating an additive (or additives) into a first lignocellulosic material. The partially impregnated lignocellulosic material exhibits enhanced material properties while maintaining adhesive bondability to a second lignocellulosic material without the need for secondary treatment, specialty adhesive, or a modified bonding process.

In another preferred embodiment, a singleface corrugated board is formed by combining a partially impregnated lignocellulosic material and a fluted medium. The partially impregnated lignocellulosic material has an impregnation surface and an opposite surface. The fluted medium is adhesively bonded onto the opposite surface of the partially impregnated lignocellulosic material.

In yet another preferred embodiment, a singlewall corrugated board is formed by combining two partially impregnated lignocellulosic materials and a fluted medium. The two partially impregnated lignocellulosic materials have impregnation and opposite surfaces. The fluted medium is adhesively bonded onto the opposite surfaces of both partially impregnated lignocellulosic materials.

The present invention may be practiced using a variety of commercially available impregnating machines/processes, such as, but not limited to, size presses and the like. The preferred method uses the equipment patented by MIPLY Inc. (Gurnee, Ill.). The MIPLY process utilizes a pressure saturator, and is described in detail in U.S. Pat. No. 4,588,616, herein incorporated by reference. The MIPLY pressure saturator can be used to saturate lignocellulosic materials, specifically, but not limited to, linerboard and medium either in-line with a corrugator, or off-line at a separate facility. The saturator consists of a converging annular chamber, that is formed between a cylindrical rotating mandrel and a cylindrical stationary shoe eccentrically located with respect to the mandrel. The additives solution or dispersion is pumped into the converging chamber, and the paper travels in contact with the mandrel leaving one paper surface (i.e., impregnation surface) exposed to the additives solution. The mandrel is engraved to accommodate the air escaping from the paper's other surface (i.e., opposite surface). During the pressure impregnation process the paper becomes impregnated with additives by means of hydrodynamic pressure, which is generated between the rotating mandrel and the shoe, and hydrostatic pressure, which is generated by the pressure of the pump that supplies the additives solution or dispersion to the converging chamber. After passing out of the MIPLY pressure saturator, the paper is dried using air flotation dryers or other paper drying methods known to those skilled in the art.

The level of impregnation (also called add-on level) with the MIPLY pressure saturator can be controlled by the following variables and settings (but not limited to): 1) viscosity, temperature, and solids content of the additives solution or dispersion, 2) additives chemistry, 3) paper structure and properties, 4) line speed of lignocellulosic material web or rotational speed of mandrel, and 5) hydrodymanic and hydrostatic pressures (i.e., pump pressure and chamber geometry). For example, the add-on level can be increased by increasing the porosity of the substrate, and/or chamber pressure, and/or solids content of the additives solution, and/or decreasing the mandrel speed (although, a decrease of the mandrel speed will decrease the pressure in the chamber). The dryer temperatures have no effect on add-on level. Finally, both additives solution viscosity and mandrel speed appear to have an optimum range for achieving maximum additive add-on level.

Finally, the penetration depth of the additives can be measured with various techniques. The most preferred technique is SEM-EDAX (Scanning Electron Microscopy combined with Energy Dispersive Analysis with X-Rays).

EXAMPLE 1

A 35# linerboard (170 gsm; product USP70 from Georgia-Pacific Inc.; Atlanta, Ga.) is used as the lignocellulosic material. An aqueous calcium lignosulfonate solution (CaLS; LIGNOSITE 50 from Georgia-Pacific Inc.) is used as the additives solution or dispersion with calcium lignosulfonate serving as the strengthening additive for the linerboard. The calcium lignosulfonate solids content of the LIGNOSITE 50 solution as received from the supplier is about 40% by weight, and the total solids content is about 50% by weight. Prior to use, the calcium lignosulfonate solution used to impregnate the linerboard is obtained by diluting the original LIGNOSITE 50 solution to 49% total solids content. Its solution viscosity is about 35 seconds (s) as measured on a 4-mm DIN viscosity cup.

The partial impregnation is achieved using a pilot-scale MIPLY pressure saturator such as that located at Vits Maschinenbau GmbH (Langenfeld, Germany). The MIPLY saturator settings in this particular experiment are as follows: 1) line speed or linerboard web speed is set to 16 m/min (0.27 m/s); 2) chamber pressure is about 1.2 bar (0.12 MPa; 17.4 psi); and 3) temperature in the two separate air flotation dryers (both approximately 2.5 m in length) is set at 120° C. The 35# linerboard is 400 mm (15¾ in.) in width and travels from an unwind stand, through the MIPLY pressure saturator with the felt side of the linerboard in intimate contact with the additives solution in the converging chamber, then through two separate air flotation dryers, and then finally to a rewind stand. In this experiment the felt side is the impregnation surface and the wire side is the opposite surface.

The level of add-on of CaLS achieved is about 37% by weight. The treated 35# linerboard is partially impregnated by the CaLS. This is determined by the spatial distribution of CaLS across the thickness of the linerboard (similar to FIG. 3) using the SEM-EDAX technique (Hitachi S-2700 SEM with EDAX system made by Oxford Instruments and Link ISIS software for the X-Ray analysis). The average penetration depth is determined to be about 80% of the thickness of the linerboard. Using image analysis, the percent coverage of the opposite surface (i.e., wire side) with CaLS is determined to be about 5%.

Figure 7:
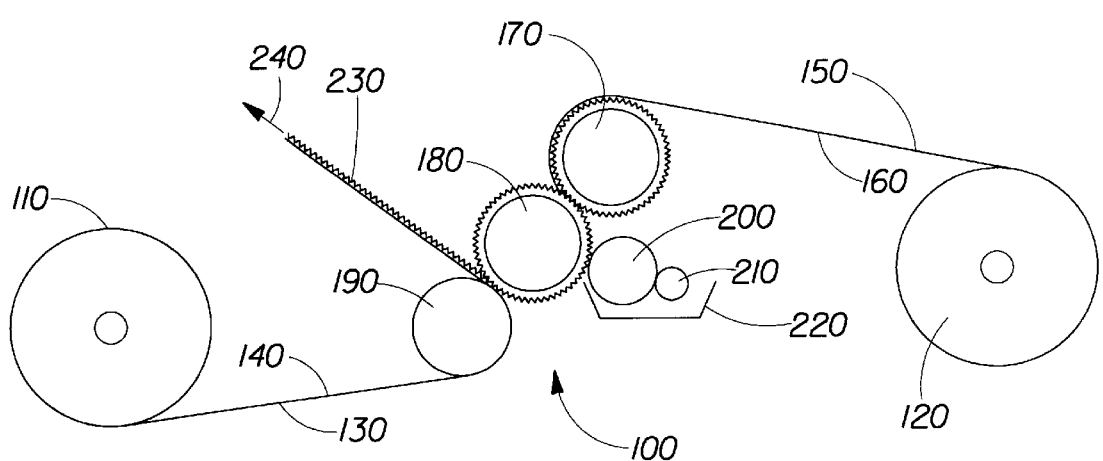
FIG. 7 is a simplified illustration of a typical singlefacer set-up used to adhesively bond partially impregnated linerboard with untreated medium.

In a subsequent stage, the 35# linerboard impregnated as described above is combined into singleface corrugated board using a pilot scale corrugator (12 in. wide Langstone singlefacer; schematically described in FIG. 7 and discussed towards the end of the disclosure) such as that located at the Institute of Paper Science and Technology (IPST; Atlanta, Ga.). The corrugator is equipped with C-flute corrugating rolls. A 26# untreated medium (127 gsm; from Georgia-Pacific Inc.) is also employed. The corrugator is operated under typical conditions (i.e., pressures, temperatures, etc.) using a conventional starch-based adhesive, and without any specialty adhesives. The operating conditions are as follows: steam pressure is set to 165 psi (1.14 MPa); temperature of all rolls is set to 360° F. (182° C.); pressure roll gap is set to 10 mils (0.254 mm); glue roll gap is 10 mils (0.254 mm); glue film thickness is maintained at 8 mils (0.203 mm); pressure roll to lower corrugator roll line pressure is set to 200 pli (pounds per lineal inch of roll width; 35 kN/m); upper corrugator roll to lower corrugator roll line pressure is set to 310 pli (54.3 kN/m); and the spacing of the corrugator fingers is set at 2 in. (5.08 cm). A conventional starch-based corrugating adhesive is supplied by the IPST having a solids content of about 25% by weight; a Stein Hall cup viscosity of about 33 s–41 s; and a gel temperature of 141° F. (60.6° C.).

Using the above corrugator settings and adhesive composition described above, excellent bonding between the partially impregnated 35# linerboard and untreated medium can be obtained at corrugator speeds ranging from 100 fpm (0.51 m/s) to speeds exceeding 800 fpm (4.06 m/s).

Figure 5:
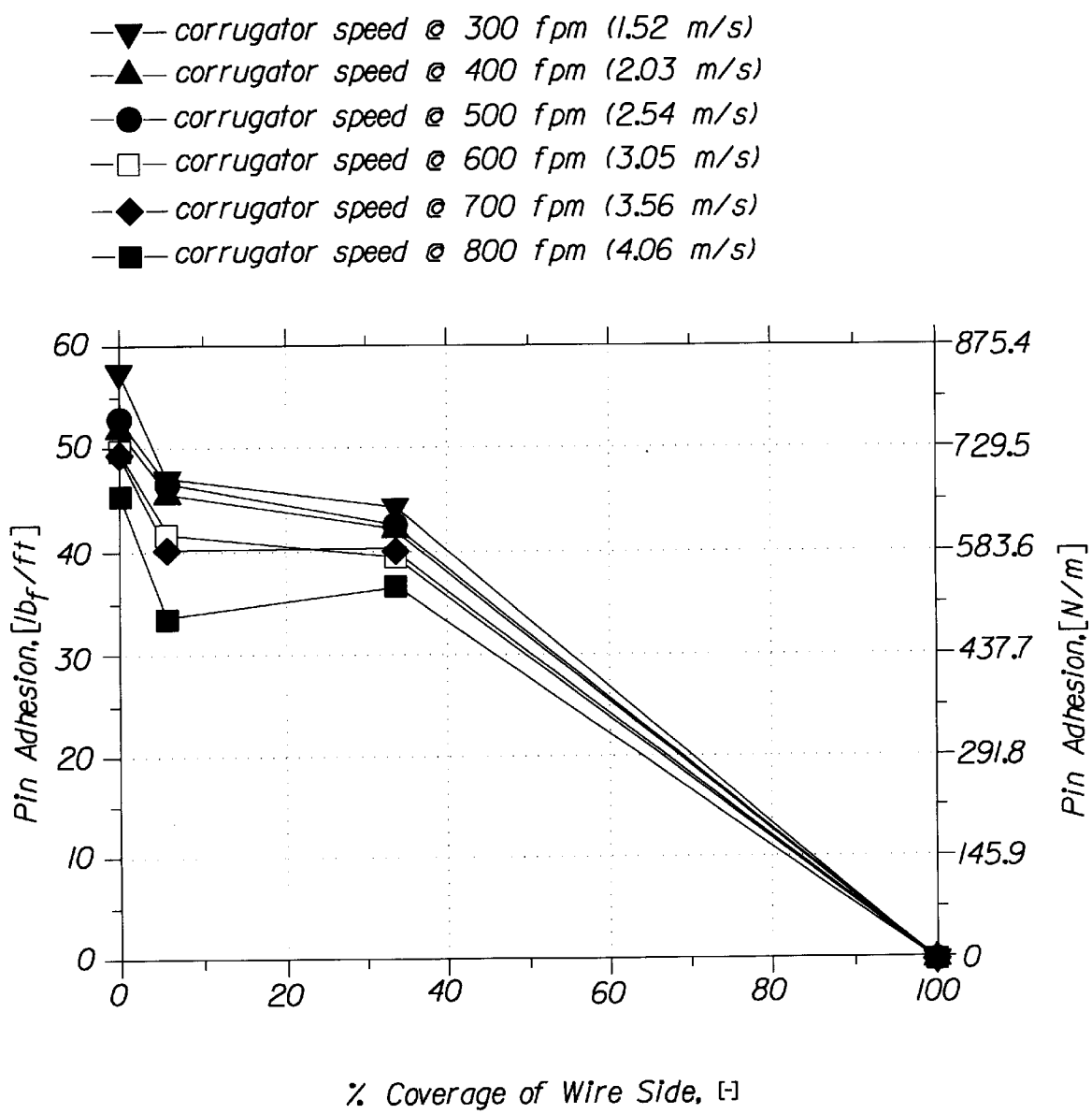
FIG. 5 is a plot of singleface pin adhesion as a function of percent coverage of the opposite surface at various corrugator speeds. The lines are guides to the eye.

The singleface bond (i.e., the bond between the first linerboard and the fluted medium) created as described within this Example is found to be strong and exhibits significant tearing of the fibers (referred to in the art as "fiber tear") when one attempts to separate the linerboard from the medium. Typically, this bond strength is denoted as "pin adhesion", and defined as the force required to separate corrugated board between the flute tips of corrugated medium and its linerboard facing per length of glue line. Pin adhesion is measured using TAPPI standard T821 om-96, and reported in FIG. 5 at various corrugator speeds from 300 fpm (1.52 m/s) to 800 fpm (4.06 m/s) for varying degrees of wire side coverage. In FIG. 5, the pin adhesion data plotted at 0% coverage correspond to control samples that result from bonding untreated 35# linerboard to untreated 26% medium. Also in FIG. 5, the pin adhesion values plotted at 5% coverage of the wire side correspond to samples that result from partially impregnated linerboard samples bonded to untreated 26# medium according to this example. The pin adhesion values plotted at 100% coverage correspond to samples that result from bonding the impregnation surface of partially impregnated linerboard, coated linerboard, or fully impregnated linerboard. The pin adhesion in these cases is zero or very nearly zero regardless of line speed. It can also be noted in FIG. 5 that the pin adhesion decreases with increasing corrugator speed. This behavior is typically observed and understood by those familiar with the art of corrugating.

In an additional step, the singleface corrugated produced above with partially impregnated 35# linerboard with 37% CaLS add-on and 26# untreated medium is further converted (at IPST) into a singlewall corrugated board by doublebacking it with a second partially impregnated linerboard produced as described above and also containing 37% CaLS add-on. The doublebacking operation uses the same adhesive as that used in the singleface operation described above. Again, the wire side of the second partially impregnated linerboard is used for bonding with the fluted medium.

Next, three sets of C-flute RSC-type (regular slotted containers) corrugated boxes with narrow flaps are die cut from the corrugated board, folded, and glued together with a suitable hot melt adhesive. All boxes have a length of 28 cm (11 in.), width of 21.6 cm (8.5 in.), height of 20.3 cm (8 in.), and flaps of width 5 cm (2 in.). The first set contains boxes that are made using the corrugated board that is produced as described above in this example. The second set contains boxes that are made using corrugated board made with partially impregnated 35# linerboards with 12% CaLS add-on, 26# untreated medium, and produced as described above in this example. Finally, the third set contains boxes (also called untreated control boxes with narrow flaps) that are made using corrugated board with untreated 35# linerboard, untreated 26# fluted medium, and produced as described above in this example.

These boxes are then preconditioned, conditioned, and compression tested at 50% RH according to TAPPI standard T804 om-89, and using a Lansmont tester (model #76-5; Lansmont Inc., Lansing, Mich.). The cross-head speed of the tester is set to 1.27 cm/min (0.022 cm/s; or equivalently 0.5 in./min) and the peak compressive load (also called compression strength) for a maximum compression of 2.541 cm (1 in.) is reported.

Figure 6:
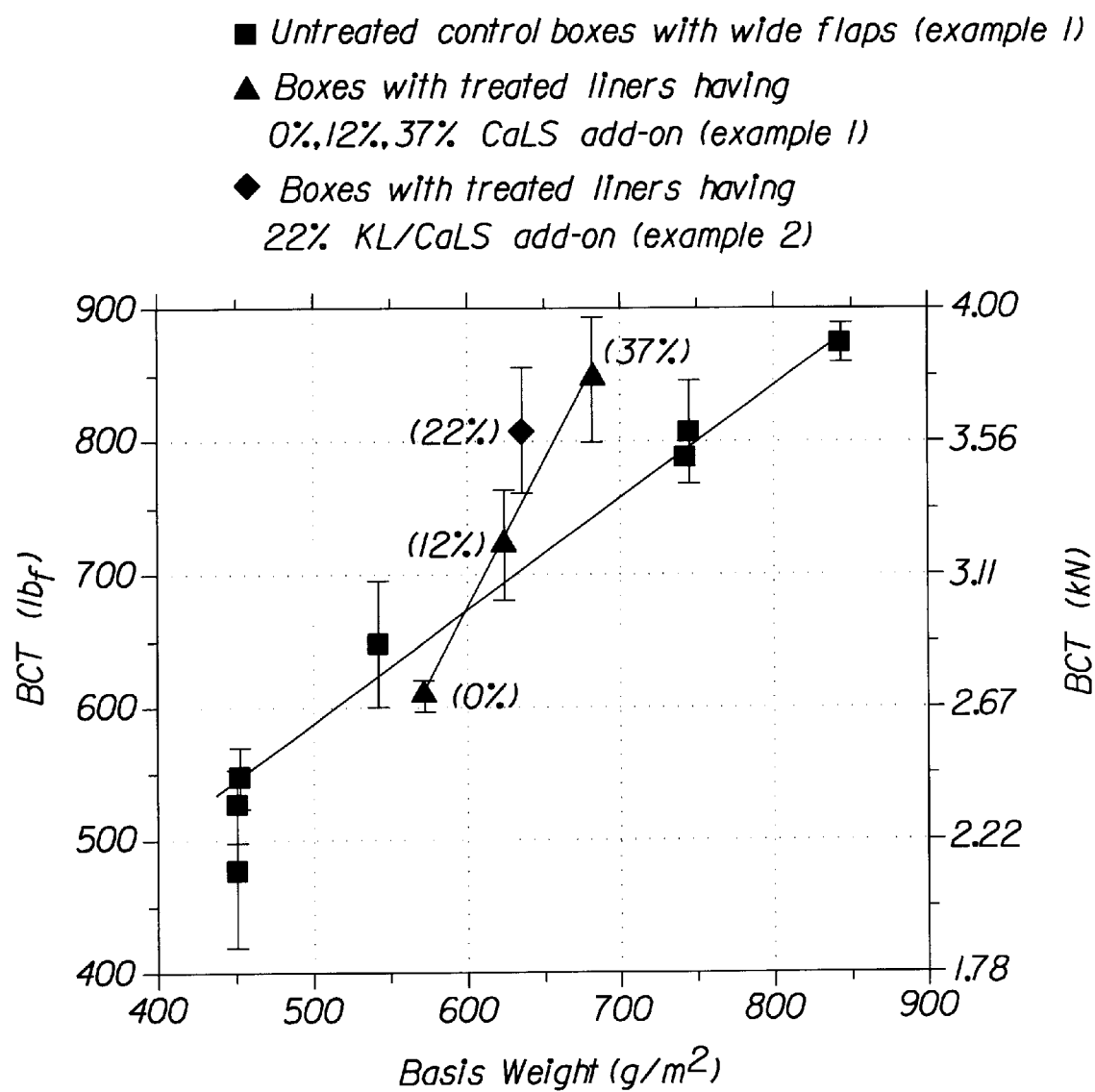
FIG. 6 is a plot of box compression strength at 50% relative humidity (RH) as a function of corrugated board basis weight for untreated singlewall corrugated board and corrugated board consisting of partially impregnated linerboards and untreated medium. The lines are guides to the eye.

FIG. 6 includes compression strength data of boxes of this example with narrow flaps as well as untreated control boxes with wide flaps. The untreated control boxes with wide flaps are C-flute RSC boxes made with corrugated board supplied by Georgia-Pacific. Their length and width are the same as those of the boxes with narrow flaps; however their height is 29.2 cm (11.5 in.), and width of the flaps is 10.2 cm (4 in.). FIG. 6 enables the enhanced compression strength performance of boxes made from partially impregnated linerboards to be compared with data for untreated control boxes made with equal basis weight singlewall corrugated board.

EXAMPLE 2

A 35# linerboard, similar to that used in Example 1, is partially impregnated with a strengthening composition consisting of 17.5% by weight CaLS solids, obtained from the LIGNOSITE 50 solution, and 12.5% by weight kraft lignin (KL) solids (INDULIN AT from Westvaco Inc.; New York, N.Y.). The solvent system of the above strengthening composition consists of 47% water and 53% acetone by weight. The viscosity of the additives solution is about 15 s as measured on a 4-mm DIN viscosity cup.

The partial impregnation is carried out on a pilot-scale MIPLY pressure saturator such as that located at Vits Maschinenbau GmbH (Langenfeld, Germany). The MIPLY saturator settings in this particular experiment are as follows: 1) line speed or linerboard web speed is set to 8 m/min (0.13 m/s); 2) chamber pressure is about 1.4 bar (0.14 MPa; 20.3 psi); and 3) temperature in the two separate air floatation dryers is set at 100° C. The 35# linerboard is 400 mm (15¾ in.) in width and travels from an unwind stand, through the MIPLY pressure saturator with the felt side of the linerboard in intimate contact with the additives solution in the converging chamber, then through two separate air flotation dryers, and then finally to a rewind stand. In this experiment the felt side is the impregnation surface and the wire side is the opposite surface.

The final level of add-on of CaLS/KL is about 22% by weight. The treated 35# linerboard is partially impregnated by the CaLS/KL mixture. This is determined by the spatial distribution of CaLS/KL across the thickness of the linerboard (similar to FIG. 3) using the SEM-EDAX technique. The average penetration depth is determined to be about 80% of the thickness of the linerboard. Using image analysis, the percent coverage of the opposite surface (i.e., wire side) with CaLS/KL is determined to be about 33%. This high percent coverage of the opposite surface compared to that of Example 1, is attributed to the water-acetone solvent system, which penetrates the linerboard more than water alone.

In spite of the high percent coverage of the opposite surface, it is unexpected to find that adhesive bonding between the opposite surface (i.e., wire side) of the partially impregnated 35# linerboard and untreated medium can be obtained at corrugator speeds ranging from 100 fpm (0.51 m/s) to speeds exceeding 800 fpm (4.06 m/s) and conventional settings (the same as those described in Example 1). Furthermore, it is also unexpected to find that the singleface bond (i.e., the bond between one linerboard and the fluted medium) in Example 2 is strong and exhibits significant fiber tear when one attempts to separate the partially impregnated linerboard from the medium. This is illustrated in FIG. 5 where the pin adhesion values plotted at 33% coverage of the wire side correspond to samples prepared according to this example. The pin adhesion is shown in FIG. 5 at various corrugator speeds from 300 fpm (1.52 m/s) to 800 fpm (4.06 m/s).

Similarly to Example 1, the singleface corrugated board disclosed above (i.e., partially impregnated 35# linerboard with 22% CaLS/KL add-on bonded to 26# untreated medium) can be further converted (at IPST) into a singlewall corrugated board by doublebacking it with a second partially impregnated linerboard of this example. C-flute RSC-type corrugated boxes having a length of 28 cm (11 in.), width of 21.6 cm (8.5 in.), height of 20.3 cm (8 in.), and flaps of width 5 cm (2 in.) are then fabricated by die cutting appropriately sized blanks from the doublebacked board, folding, and gluing with a suitable hot melt adhesive. The boxes are then preconditioned, conditioned, and compression tested at 50% RH as described in Example 1. The results are included in FIG. 6.

EXAMPLE 3

A 35# linerboard is impregnated using a pilot-scale MIPLY pressure saturator such as that located at Vits Maschinenbau GmbH (Langenfeld, Germany). An aqueous solution consisting of 37.6% sodium silicate by weight (product "N" from PQ Corporation; Valley Forge, Pa.) is used as the additives solution or dispersion. The MIPLY saturator settings of this particular experiment are as follows: 1) line speed or linerboard web speed is set to 23 m/min (0.38 m/s); 2) chamber pressure is about 2.0 bar (0.2 MPa, 29 psi); and 3) temperature in two separate air floatation dryers is set at 170° C. The 35# linerboard travels through the MIPLY saturator with the felt side (i.e., outside surface) of the linerboard in intimate contact with the additives solution in the converging chamber, then into two separate air flotation dryers, and then finally to a rewind stand. Due to the chemistry and trial conditions, the additives are impregnated completely through the 35# linerboard and as a result they contact and contaminate the rotating mandrel. Full penetration results in the linerboard sticking to the mandrel, fiber tear or damage to the treated linerboard, and downtime to clean the mandrel. Thus, in addition to the aforementioned bonding problems, significant or total impregnation through to the wire side of the linerboard also causes line hygiene and other processing problems on the MIPLY saturator.

In general, adhesive bonding of impregnated linerboard to fluted medium in a corrugator is a key problem in producing combined corrugated board. Typical problems that arise include, but are not limited to, the following: 1) inability to combine the medium and the treated linerboard at the singlefacer; 2) inability to combine medium and treated linerboard at commercially feasible operating speeds or without the aid of expensive specialty adhesives; and 3) inability to achieve tough, non-brittle adhesive bonds between the treated linerboard and medium with high pin adhesion. As a result, high speed adhesive bondability between treated linerboard and untreated fluted medium on a conventional corrugator is difficult to achieve.

However, the partially impregnated lignocellulosic materials of the present invention solve the above problem by leaving the opposite surface 30 in FIG. 3 only partially covered with additives. No prior or existing impregnated linerboard has achieved this level of performance with respect to high speed adhesive bonding, pin adhesion, and compression strength using conventional corrugator settings and equipment. FIG. 5 also demonstrates that there is little difference in singleface pin adhesion as the percent coverage of the opposite surface (i.e., wire side) increases from 5% to 33%. Note that in FIG. 5 the lines are guides to the eye. One skilled in the art would assume that as the bonding sites are reduced (i.e., more wire side coverage) the pin adhesion values would also reduce as a function of percent coverage. However, our findings suggest that the partially impregnated linerboard with 33% wire side coverage has pin adhesion values of about 40 lbf/ft, which are considered acceptable by the trade.

FIG. 7 is a simplified schematic that illustrates the conversion of the partially impregnated linerboard and untreated medium into combined singleface on a corrugator. In the set-up pictured, the partially impregnated linerboard 110 with the opposite surface (wire side) 130, that is partially covered with additives, and the impregnation surface (felt side) 140, that is fully covered with additives, travels into the singlefacer 100. The untreated medium 120 with wire side 150 and felt side 160 also travels into the singlefacer 100. Note that preheating and preconditioning rolls have been omitted for simplicity. Singlefacer 100 consists of an upper corrugating roll 170, lower corrugating roll 180, pressure roll 190, glue roll 200, metering roll 210, and glue pan 220. Also note several parts are omitted for simplicity. Upper corrugating roll 170 and lower corrugating roll 180 form the fluted medium and glue roll 200 applies adhesive to the tips of the fluted medium. Singleface 230 is formed as the fluted medium with adhesive presses against opposite surface (wire side) 130 of partially impregnated linerboard 110. Singleface 230 then travels out of singlefacer 100 in direction 240. A similar bonding scenario is followed in order to apply a second partially impregnated linerboard to generate a corrugated board. The opposite surface (wire side) of the second linerboard is adhesively bonded to the wire side of the medium.

In the case of two or more additives, the partial impregnation of lignocellulosic materials that was described above, can be achieved in a number of ways. For example, the two or more additives can be incorporated into the materials in one processing step, or in several sequential steps. Note that in the case of several steps, it is conceivable that the overall percent coverage of the opposite surface will consist of the sum of the percent coverages of the individual additives.

We claim:

1. A partially impregnated lignocellulosic material, comprising:
   a) a first lignocellulosic material having an impregnation surface and an opposite surface; and
   b) an additive partially impregnated into said first lignocellulosic material from said impregnation surface toward said opposite surface wherein said additive covers said impregnation surface and penetrates said first lignocellulosic material through its thickness to various penetration depths such that said opposite surface includes surface areas covered with said additive and other surface areas of no coverage with said additive, thereby forming a partially impregnated lignocellulosic material having said opposite surface exhibiting adhesive bondability to a second lignocellulosic material.

2. A product according to claim 1, wherein said first lignocellulosic material has a basis weight from about 40 grams per square meter to about 800 grams per square meter.

3. A product according to claim 1, wherein said first lignocellulosic material has a basis weight from about 50 grams per square meter to about 600 grams per square meter.

4. A product according to claim 1, wherein said first lignocellulosic material has a basis weight from about 60 grams per square meter to about 400 grams per square meter.

5. A product according to claim 1, wherein said additive is a strengthening agent.

6. A product according to claim 5, wherein said strengthening agent is selected from the group consisting of lignosulfonate, kraft lignin, organosolv lignin, chemically modified lignin derivatives, sodium silicate, starch, xylan, carboxymethyl cellulose, polyvinyl-acetate, vinyl polymers, acrylic polymers, and mixtures thereof.

7. A product according to claim 1, wherein said additive is made into an additive solution prior to impregnation of said first lignocellulosic material.

8. A product according to claim 7, wherein said additive solution is made using a solvent selected from the group consisting of water, acetone, ethanol, methanol, and methyl ethyl ketone, and mixtures thereof.

9. A product according to claim 1, wherein said additive increases compression strength.

10. A product according to claim 1, wherein an average penetration depth of said additive is at least about 50% of the thickness of said partially impregnated lignocellulosic material.

11. A product according to claim 1, wherein an average penetration depth of said additive is at least about 60% of the thickness of said partially impregnated lignocellulosic material.

12. A product according to claim 1, wherein an average penetration depth of said additive is at least about 75% of the thickness of said partially impregnated lignocellulosic material.

13. A product according to claim 10, wherein the percent coverage of said opposite surface with said additive ranges from about 0% to about 60%.

14. A product according to claim 1, wherein a percent coverage of said opposite surface area with said additive ranges from about 2% to about 50%.

15. A product according to claim 1, wherein a percent coverage of said opposite surface area with said additive ranges from about 4% to about 40%.

16. A singleface corrugated board comprising:
   a) a first lignocellulosic material having an impregnation surface and an opposite surface;
   b) an additive partially impregnated into said first lignocellulosic material from said impregnation surface toward said opposite surface wherein said additive covers said impregnation surface and penetrates said first lignocellulosic material through its thickness to various penetration depths such that said opposite surface includes surface areas covered with said additive and other surface areas of no coverage with said additive, thereby forming a partially impregnated lignocellulosic material having said opposite surface exhibiting adhesive bondability; and
   c) a fluted medium adhesively bonded onto said opposite surface of said partially impregnated lignocellulosic material.

17. A singlewall corrugated board comprising:
   a) a first lignocellulosic material having an impregnation surface and an opposite surface;
   b) an additive partially impregnated into said first lignocellulosic material from said impregnation surface toward said opposite surface wherein said additive covers said impregnation surface and penetrates said first lignocellulosic material through its thickness to various penetration depths such that said opposite surface includes surface areas covered with said additive and other surface areas of no coverage with said additive, thereby forming a first partially impregnated lignocellulosic material having said opposite surface exhibiting adhesive bondability;
   c) a second lignocellulosic material having an impregnation surface and an opposite surface;
   d) an additive partially impregnated into said second lignocellulosic material from said impregnation surface toward said opposite surface wherein said additive covers said impregnation surface and penetrates said first lignocellulosic material through its thickness to various penetration depths such that said opposite surface includes surface areas covered with said additive and other surface areas of no coverage with said additive, thereby forming a second partially impregnated lignocellulosic material including said opposite surface exhibiting adhesive bondability and;
   e) a fluted medium adhesively bonded between said opposite surface of said first partially impregnated lignocellulosic material and said opposite surface of said second partially impregnated lignocellulosic material.

* * * * *

UNITED STATES PATENT AND TRADEMARK OFFICE
CERTIFICATE OF CORRECTION

PATENT NO. : 6,194,057 B1  
DATED : February 27, 2001  
INVENTOR(S) : Steven Michael Schennum et al.

Page 1 of 1

It is certified that error appears in the above-identified patent and that said Letters Patent is hereby corrected as shown below:

Please rewrite claim 13 in its entirety:
--- A product according to Claim 1, wherein a percent surface of said opposite surface area with said additive ranges from about 0% to about 60%. ---.

Claim 14,
Line 1, after "percent" insert -- surface area --.
Line 2, delete " area".

Claim 15,
Line 1, after "percent" insert -- surface area --.
Line 2, delete "area".

Signed and Sealed this

Nineteenth Day of February, 2002

Attest:

Attesting Officer

JAMES E. ROGAN
*Director of the United States Patent and Trademark Office*